INVENTORS
L. GOLDMAN
H. E. WELLER
BY L. Gundersen
ATTORNEY

Dec. 29, 1964   L. GOLDMAN ETAL   3,163,372
APPARATUS FOR CONTINUOUSLY MOVING A STRAND
THROUGH AN EXTRUDER AT A CONSTANT SPEED
Filed Oct. 26, 1962   6 Sheets-Sheet 5

INVENTORS
L. GOLDMAN
H. E. WELLER

BY *S. Gundersen*
ATTORNEY

Dec. 29, 1964       L. GOLDMAN ETAL       3,163,372
            APPARATUS FOR CONTINUOUSLY MOVING A STRAND
                THROUGH AN EXTRUDER AT A CONSTANT SPEED
Filed Oct. 26, 1962                         6 Sheets-Sheet 6

INVENTORS
L. GOLDMAN
H. E. WELLER

BY P. Gundersen
ATTORNEY

United States Patent Office 3,163,372
Patented Dec. 29, 1964

3,163,372
APPARATUS FOR CONTINUOUSLY MOVING A STRAND THROUGH AN EXTRUDER AT A CONSTANT SPEED
Lawrence Goldman and Herbert E. Weller, Buffalo, N.Y., assignors to Western Electric Company, Incorporated, New York, N.Y., a corporation of New York
Filed Oct. 26, 1962, Ser. No. 233,289
3 Claims. (Cl. 242—47.08)

This invention relates to an apparatus for maintaining a continuous flow of cable core to an extruder head and more particularly to an apparatus for maintaining a continuous flow of cable core to a continuously operating extruder head at a constant predetermined line speed.

Because stopping an extruder may necessitate dismantling and cleaning of the extruder, it is highly desirable to operate the extruder continuously. Difficulty is experienced in maintaining a continuous passage of cable core through a continuously operating extruder so as to avoid unnecessary stoppages of the extruder. This problem is particularly acute where it is necessary to insulate a plurality of relatively short lengths of cable core. Also, in order to maintain uniformity in the extruded sheath so as to produce insulated cable having uniform and predetermined electrical properties, it is necessary to supply cable core to the extruder at a constant predetermined line speed. It is also necessary to maintain a relatively constant tension on the cable core so as to avoid excessive stretching of the cable core. Therefore, not only is difficulty encountered in maintaining a continuous flow of cable core through the extruder, but difficulty is also encountered in maintaining the flow of cable core at a constant predetermined line speed without exerting excessive tension on the cable core.

Therefore, an object of this invention is to provide facilities for maintaining a continuous passage of cable core through an extruder at a constant rate of speed.

A further object of this invention is to provide facilities for maintaining a continuous flow of cable core through an extruder at a constant rate of speed while maintaining a constant tension on the cable core.

With these and other objects in view, the present invention contemplates a supply accumulator having a fixed sheave assembly and a carriage displaceable relative to the assembly so as to expand the accumulator to store a strand and to collapse the accumulator to deliver the strand at a constant predetermined line speed in response to changes in the tension of the strand on the accumulator. Further, the present invention contemplates a take-up accumulator having a fixed sheave assembly and a carriage displaceable relative to the assembly so as to collapse the accumulator and to expand the accumulator to take up the strand at a constant predetermined line speed in response to changes in the tension of the strand on the accumulator.

Other objects and advantages of the present invention will be apparent from the following detailed description when considered in conjunction with the accompanying drawings, wherein.

Figure 1:
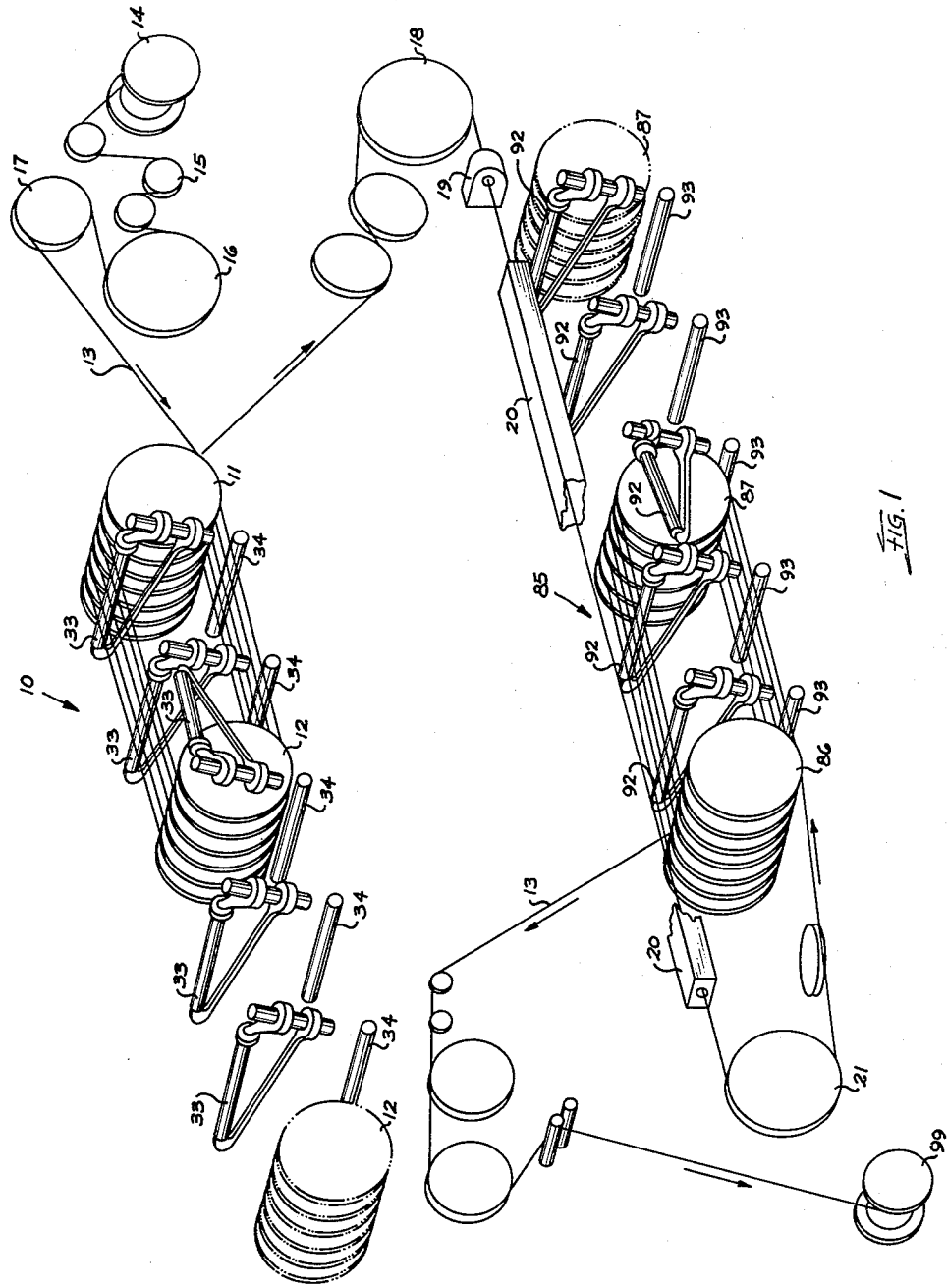
FIG. 1 is a diagrammatical view showing the flow of cable core through an extruder head embodying the principal features of the present invention.

Referring now to the drawings and particularly to FIG. 1, a supply accumulator is generally indicated by the numeral 10. The supply accumulator 10 includes a fixed sheave assembly 11 and a movable carriage 12. A strand or cable core 13 is stranded from supply reel 14 through dancer 15, pay-off capstan 16 and reversing sheave 17, onto the accumulator 10. The cable core 13 is pulled from the accumulator 10 by a tension capstan 18, and the cable core 13 is pulled through an extruder head 19 and cooling trough 20 by a main capstan 21.

Figure 2:
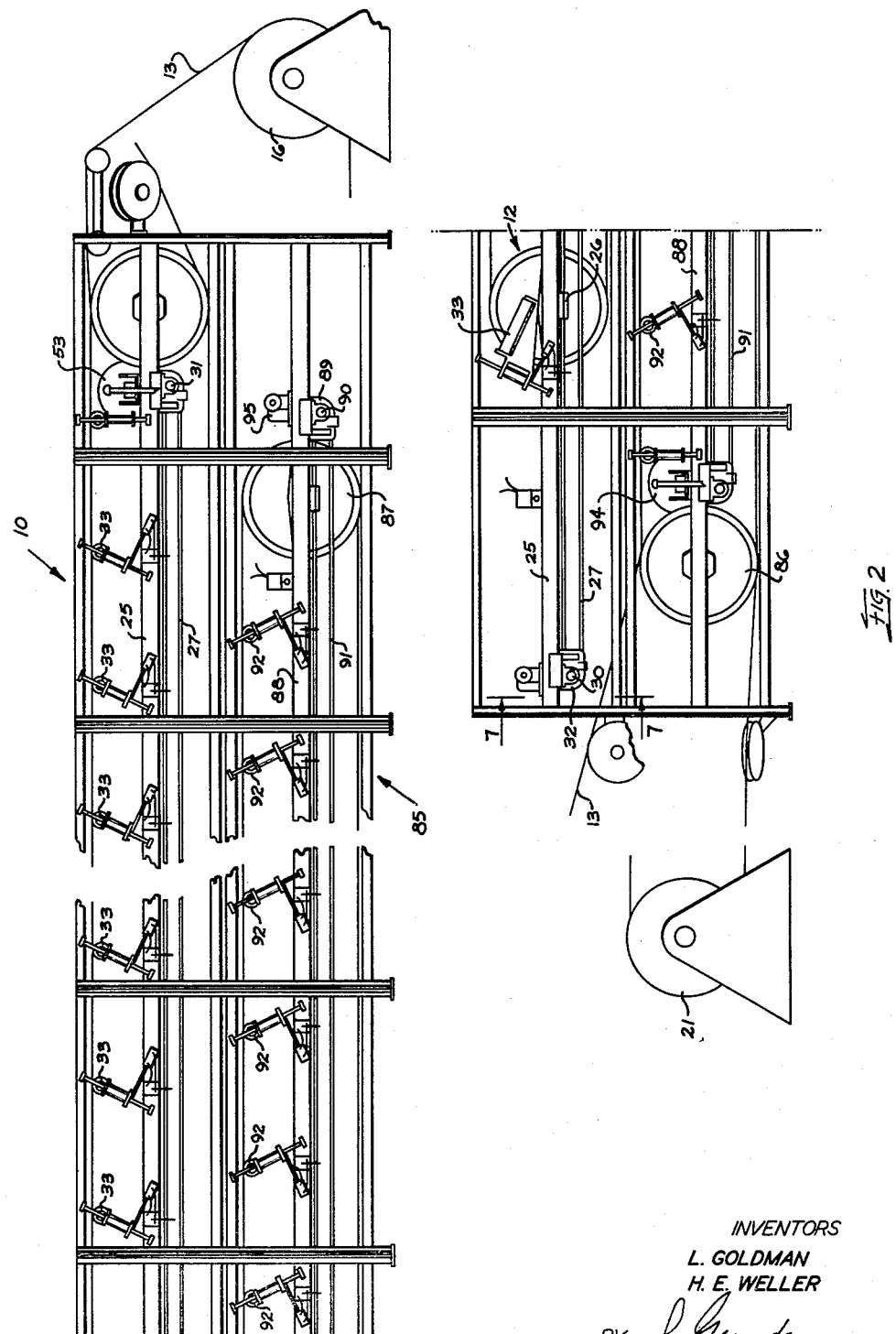
FIG. 2 is a partial side elevational view showing a supply accumulator and a take-up accumulator embodying the principal features of the present invention.

Referring to FIG. 2, the movable carriage 12 is mounted in a trackway or guide 25, and is attached by bracket 26 to chain 27. The chain 27 is carried on a sprocket 28 (FIG. 7) and on a sprocket 29 (FIG. 6), which are mounted on shafts 30 and 31, respectively. Constant torque motor 32 drives the shaft 30 to rotate sprocket 28. The movable carriage 12 is displaced in trackway 25 as chain 27 is moved in response to the rotation of sprocket 28. The cable core 13 will exert a force on the movable carriage 12 toward the fixed sheave assembly 11 due to the tension of the cable core on the supply accumulator 10. The constant torque motor 32 tends to rotate shaft 30 in a counterclockwise direction (FIG. 2), and exerts a constant force on the movable carriage 12 opposite to the force exerted on the movable carriage 12 by the cable core 13. If the force exerted on the movable carriage 12 by the cable core 13 is less than the constant force exerted on the movable carriage 12 by the torque of the motor 32, the motor will rotate the shaft 30 (FIG. 2) counterclockwise to move the movable carriage 12 away from fixed sheave assembly 11 so as to expand the supply accumulator 10. If, on the other hand, the force exerted on the movable carriage 12 by the cable core 13 is greater than the force exerted on the movable carriage 12 by the torque of the motor 32, the shaft will rotate clockwise against the torque exerted by the motor 32, whereby the movable carriage 12 will move toward the fixed sheave assembly 11 so as to collapse the supply accumulator 10. Obviously, if the force exerted by cable core 13 on the movable carirage 12 is equal to the force exerted on the carriage 12 by the torque of motor 32, there will be no relative displacement of the sheave assembly 11 and movable carriage 12. The torque of motor 32 is set so that the constant force exerted on the movable carriage 12 by the motor 32 is equal to the force exerted on the movable carriage 12 by the cable core 13 when the cable core is delivered to the accumulator 10 at the same rate it is pulled from the accumulator. Therefore, the carriage 12 is not displaced relative to sheave assembly 11 when these conditions are satisfied.

Cable support arms 33 extend over the trackway 25 in order to support the catenary weight of the cable core stranded over the top of the fixed sheave assembly 11 and movable carriage 12 as is best seen in FIG. 1. Rollers 34 are fixedly mounted transverse to the trackway 25 so as to support the catenary weight of the cable core stranded under the fixed sheave assembly 11 and movable carriage 12. By supporting the catenary weight of the cable core carried by the accumulator 10, the force exerted on the movable carriage 12 by the cable core 13 is not appreciably affected by the distance between the fixed sheave assembly 11 and movable carriage 12 but depends only on the difference between the speeds at which the cable core is delivered to and pulled from the accumulator. As the movable carriage 12 is displaced in the trackway 25 relative to fixed sheave assembly 11, it is necessary, as seen in FIG. 4, to retract the cable support arms 33 in order to permit passage of the movable carriage 12.

Figure 6:
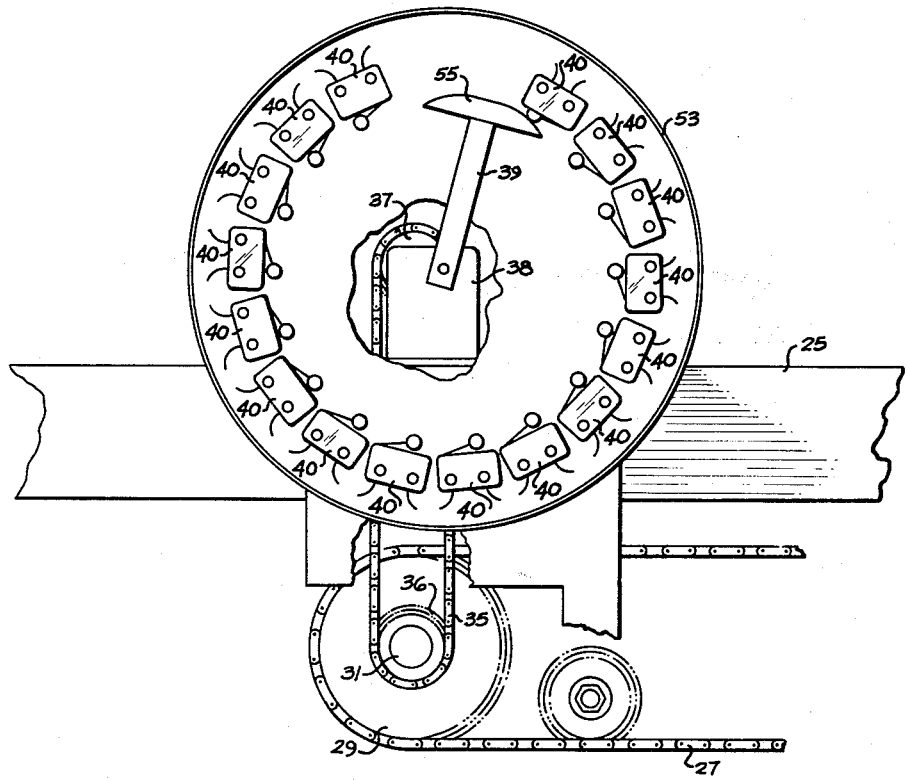
FIG. 6 is a sectional view taken along line 6—6 of FIG. 5 showing a microswitch system for controlling the position of cable support arms.

In FIG. 6, microswitch assembly for controlling the position of the cable support arms 33 is shown in detail. Chain 35 is attached by sprocket 36 to shaft 31 and by sprocket 37 to gear reduction box 38. As the movable carriage 12 is displaced in the trackway 25, arm 39 will be rotated by gear reduction box 38 in response to chain 35. Each of the cable support arms 33 is controlled by an associated microswitch 40. Therefore, by a proper choice of gear ratios in gear reduction box 38, as the movable carriage 12 approaches a particular cable support arm 33, its associated microswitch will be actuated by arm 39 to retract the cable support arm 33 so as to permit passage of the movable carriage 12.

Figure 3:
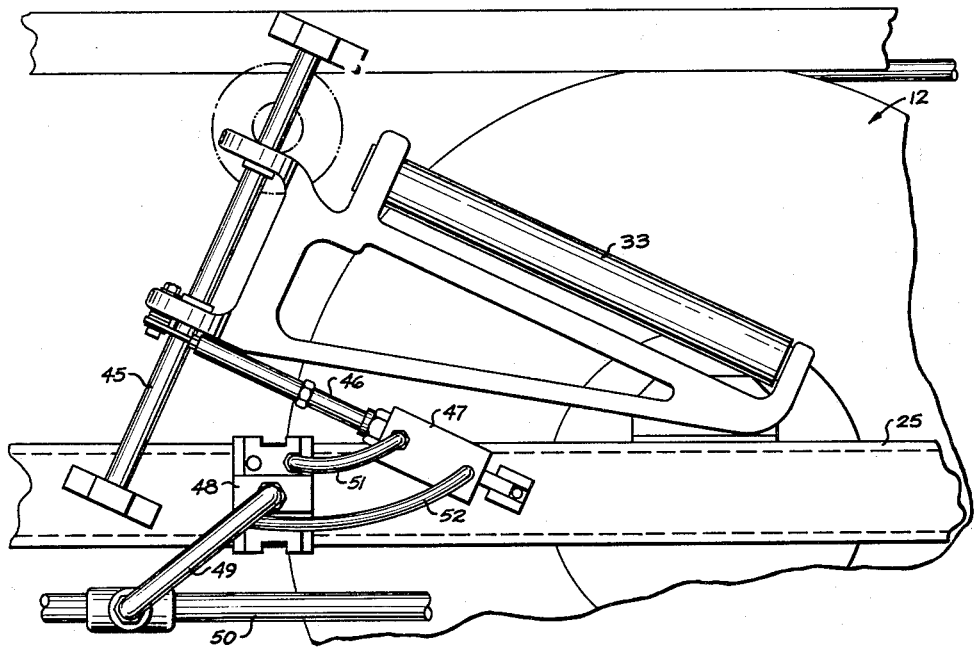
FIG. 3 is an enlarged fragmentary side elevational view showing a cable support arm for supporting the catenary weight of a cable core.
Figure 8:
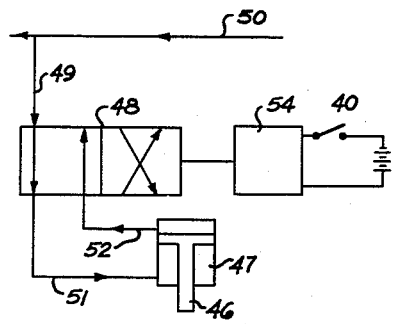
FIGS. 8 and 9 are schematic views showing a pneumatic system for positioning a cable support arm embodying the principal features of the present invention.
Figure 9:
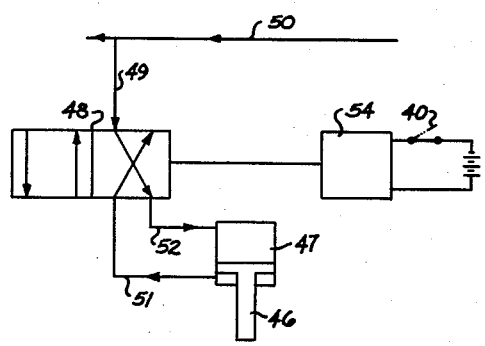

As seen in FIG. 3, the cable support arm 33 is mounted for rotation on shaft 45 and is rotated about the shaft 45 by plunger arm 46. Plunger arm 46 is extended or retracted by compressed air cylinder 47 to position cable support arm 33. Compressed air is supplied to valve 48 by conduit 49 from the compressed air line 50. When the microswitch 40 is in its open position, valve 48 routes compressed air to cylinder 47 through hose 51 so that plunger arm 46 is retracted to swing cable support arm 33 into position over the trackway 25 so as to support the catenary weight of the cable core 13 between the sheave assembly 11 and carriage 12. When microswitch 40 is closed by arm 39, the associated valve 48 is actuated to route compressed air to cylinder 47 through hose 52 so that the plunger arm 46 will be extended to pivot the cable support arm 33 about shaft 45 so as to retract cable support arm 33 to permit movable carriage 12 to pass by the cable support arm. The microswitches 40 are housed in the housing 53 (FIG. 2). The manner in which the microswitches 40 control their associated cable support arm 33 is shown diagrammatically in FIGS. 8 and 9. When microswitch 40 is open (FIG. 8), solenoid 54 is deenergized so as to permit valve 48 to route compressed air through hose 51 to compressed air cylinder 47, whereby plunger arm 46 is retracted. When the movable carriage approaches a cable support arm, its associated microswitch will be closed by arm 39 energizing solenoid 54. As seen in FIG. 9, when the solenoid 54 is energized, the valve 48 will route compressed air through hose 52 to compressed air cylinder 47, thereby extending plunger arm 46 so as to retract cable support arm 33. End portion 55 of the arm 39 is designed so that microswitch 40 will be actuated for a sufficient interval to permit the carriage 12 to completely by-pass the cable support arm 33 before the microswitch is released so as to pivot the cable support arm back into position.

Figure 4:
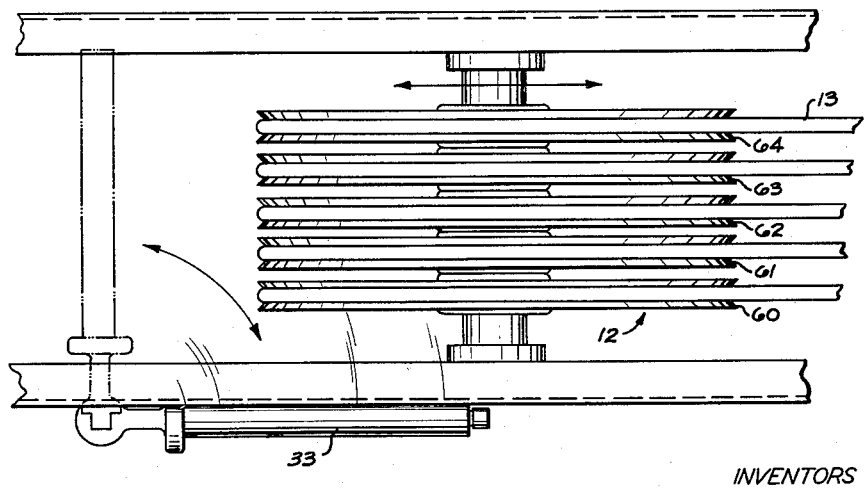
FIG. 4 is an enlarged fragmentary top view showing additional features of a cable support arm.
Figure 5:
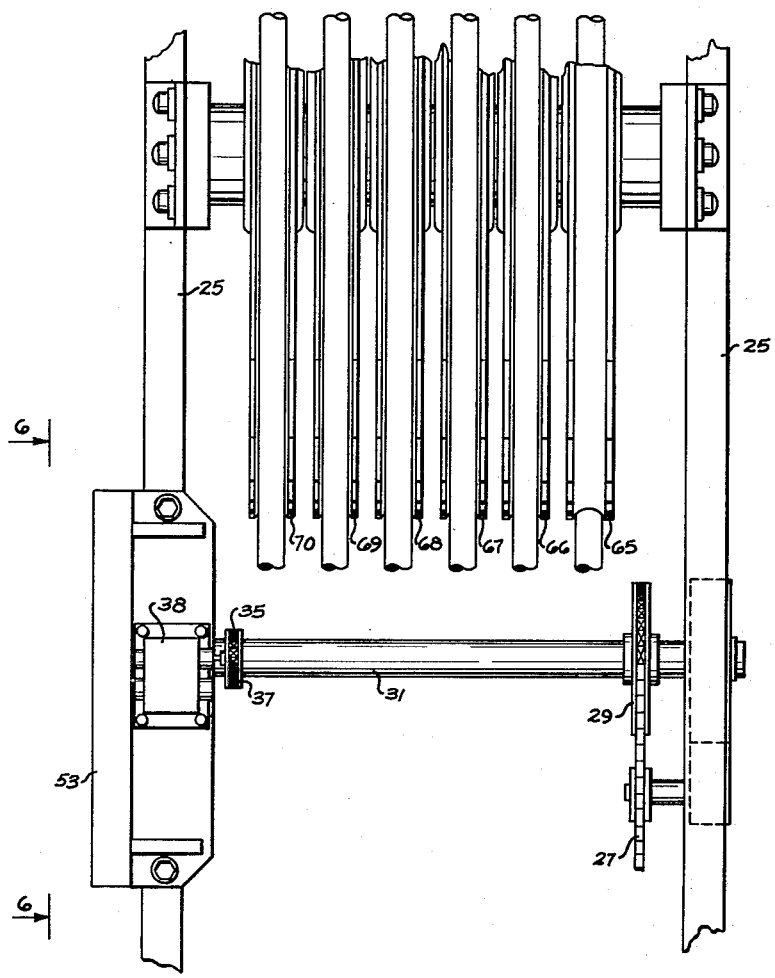
FIG. 5 is an enlarged fragmentary top view showing a fixed carriage and microswitch housing.

As will be noted in FIG. 4, movable carriage 12 carries five sheaves, 60 to 64, inclusive, which are mounted for rotation on a shaft in a side-by-side relationship. In FIG. 5 the fixed sheave assembly 11 is shown having six sheaves, 65 to 70, inclusive, mounted for rotation on a shaft in a side-by-side relationship. As the cable core 13 enters and leaves accumulator 10 by way of fixed sheave assembly 11, it is necessary to provide the fixed sheave assembly with an additional sheave. As seen in FIG. 1, the cable core enters the accumulator 10 at sheave 65 of the fixed sheave assembly and is routed back to sheave 66 of the fixed sheave assembly by sheave 60 of the movable carriage 12. In the same manner, sheaves 61, 62, 63 and 64 of the movable carriage receive cable core from sheaves 66, 67, 68 and 69, respectively, and route the cable core back to sheaves 67, 68, 69 and 70, respectively. The cable core is then pulled from accumulator 10 by way of sheave 70.

Figure 7:
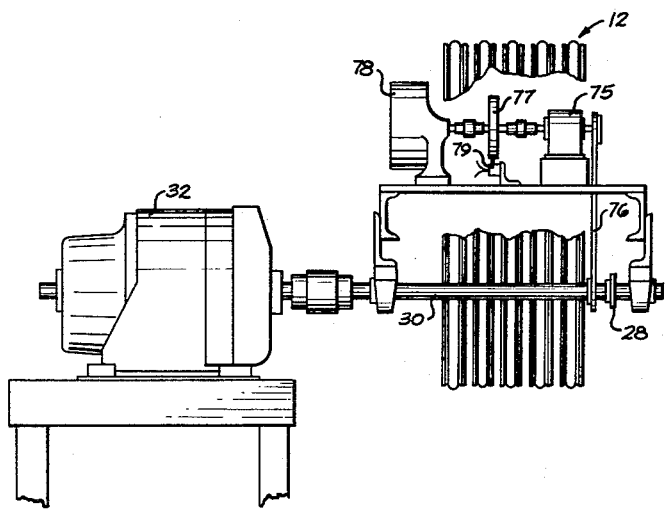
FIG. 7 is a sectional view taken along line 7—7 of FIG. 2 showing an end view of a supply accumulator.

As seen in FIG. 7, a gear reduction box 75 is belt driven from shaft 30 by belt 76. The shafts of gear reduction box 75, cam 77 and rheostat 78 are concentrically coupled together. As the movable carriage 12 approaches the end of its travel away from fixed sheave assembly 11, the cam 77 will actuate switch 79 to place the rheostat 78 in series with shunt 80 of motor 81 (FIG. 10).

Figure 10:
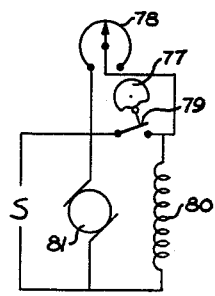
FIGS. 10 and 11 are schematic views showing an electrical control circuit embodying the principal features of the present invention.

In FIG. 10, the conventional shunt wound motor 81 for driving the pay-off capstan 16 is schematically shown. The motor 81 drives the pay-off capstan 16 at 1.2 times the line speed when the switch 79 is closed. Therefore, the supply accumulator 10 will expand to keep a constant tension on the cable core 13. As the movable carriage 12 reaches the end of its travel, the counterclockwise rotation of shaft 30 rotates cam 77 in response to belt 76 so as to open switch 79, thus placing the rheostat 78 in series with shunt 80. Further rotation of shaft 27 due to continued movement of carriage 12 increases the resistance placed across the shunt 80 by rheostat 78. Therefore, the motor 81 slows down to line speed in order to balance the force exerted on carriage 12 by constant torque motor 32.

Returning to FIG. 2, take-up accumulator 85 is constructed in the same manner as the supply accumulator 10. The take-up accumulator 85 has a fixed sheave assembly 86 and a movable carriage 87 mounted for displacement in a trackway 88. Constant torque motor 89 drives shaft 90 to displace movable carriage 87 by chain 91 in trackway 88. The torque of motor 89 is set so as to exert a force on the movable carriage 87 equal and opposite to the force exerted on carriage 87 by the tension of insulated cable core 13 when the core is pulled from the accumulator 85 at the same speed main capstan 21 delivers cable core to the accumulator 85, i.e., the constant predetermined line speed.

Cable support arms 92 and roller 93 are utilized to support the catenary weight of the cable core between the fixed sheave assembly 86 and movable carriage 87. Housing 94 contains a microswitch arrangement identical with that of housing 53. The cable support arms 92 are retracted from and extended over the trackway 88 to permit passage of movable carriage 87 in the same manner as cable support arms 33, and the position of cable support arms 92 are controlled by the microswitch system of housing 94 in the same manner as the position of cable support arms 33 are controlled by microswitches 40. The microswitching system of housing 94 is actuated in the same manner microswitches 40 are actuated.

The fixed sheave assembly 86 carries six sheaves and the movable carriage 87 carries five sheaves. The insulated cable core 13 is stranded on the fixed sheave assembly 86 and movable carriage 87 of the take-up accumulator 85 in the same manner cable core 13 is carried by the sheave assembly 11 and movable carriage 12 of supply accumulator 10.

Figure 11:
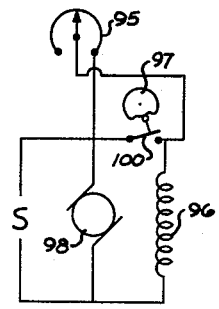

A rheostat 95 is belt driven by shaft 90 in the same manner rheostat 78 is driven by shaft 31. The rheostat 95 is placed in series with shunt 96 by cam 97 (FIG. 11) in the same manner rheostat 78 is placed in series with shunt 80 by cam 77. Motor 98 controls the speed of the take-up reel 99 so as to pull insulated cable core from the take-up accumulator 85 at 1.2 times the predetermined line speed when rheostat 95 is not in series with shunt 96. Cam 97 is positioned so as to open switch 100, placing rheostat 95 in series with shunt 96 when the movable carriage 87 approaches its closest approximation to fixed sheave assembly 86. Upon further movement of carriage 87 toward sheave assembly 86, the resistance across shunt 96 is increased by rheostat 95 so as to slow down the take-up reel 99 to line speed.

It should be noted that as cable is taken up on the take-up reel 99, the outside diameter of the reel will increase, thereby increasing the rate at which cable is pulled from the take-up accumulator 85. This in turn increases the tension on the accumulator, tending to further collapse the accumulator. As the carriage 87 moves, the rheostat 95 responds to decrease the speed of take-up reel 99, whereby the tension of the cable on the accumulator 85 will remain constant.

In operation—The supply accumulator 10 is normally in an extended condition. When the supply reel 14 is exhausted, the pay-off capstan 16 is braked to stop the flow of cable core to the supply accumulator 10. As tension capstan 18 continues to pull cable core from the supply reel at line speed, the tension of the cable core on the accumulator 10 increases, whereby a greater force is exerted on the movable carriage 12 by the cable core 13 than is exerted on the carriage 12 by constant torque motor 32. Therefore, the carriage 12 will start to move toward the fixed sheave assembly 11, thereby collapsing the supply accumulator 10. As the carriage 12 is displaced toward the fixed sheave assembly 11, chain 27 rotates shaft 30 clockwise. The clockwise rotation of shaft 30 rotates cam 77 in response to belt 76 to close switch 79, whereby the rheostat 78 is taken out of series with shunt 80 of motor 81 (FIG. 8).

Before accumulator 10 completely collapses, the supply reel 14 is replaced and pay-off capstan 16 actuated to deliver cable core to the supply accumulator 10. Approximately 30 seconds are available for a change-over at a line speed of 600 feet per minute. The motor 81 delivers cable core to the supply accumulator 10 at 1.2 times line speed as rheostat 78 is not in series with shunt 80. As a result, the tension of the cable core on supply accumulator 10 decreases and less force is exerted on the movable carriage 12 by the cable core than by the constant motor torque 32. Therefore, the movable carriage 12 will move away from fixed sheave assembly 11, expanding the supply accumulator 10. As the supply accumulator 10 approaches the end of its travel, the counterclockwise rotation of shaft 30 rotates cam 77 to open switch 79, thereby placing rheostat 78 in series with the shunt 80 of motor 81. On further travel of the movable carriage 12, the continued counterclockwise rotation of shaft 30 drives rheostat 78 by belt 76 to increase the resistance across shunt 80 of motor 81. As the resistance across shunt 80 is increased, motor 81 slows down. When the rheostat 80 has slowed motor 81 down to line speed, the movement of carriage 12 relative to fixed sheave assembly 11 stops as the forces on the carriage 12 are balanced. In this manner, a continuous flow of cable core is maintained through the extruder head 19 at a constant predetermined line speed.

Take-up accumulator 85 is normally in a collapsed condition. As the take-up reel 99 is filled, the reel will be braked, thereby stopping the flow of cable core from the take-up accumulator 85. Main capstan 21 continues to deliver cable core to the take-up accumulator 85, whereby the tension of the cable core on take-up accumulator 85 decreases. Therefore, as the force exerted on the movable carriage 87 by the insulated cable core 13 is less than the force exerted on the movable carriage 87 by constant torque motor 89, the movable carriage 87 will expand in response to motor 89 to take up the cable core delivered to the take-up accumulator 85 by main capstan 21. As the accumulator 85 expands, shaft 90 rotates in a clockwise direction and cam 97, belt driven by shaft 90, closes switch 100 (FIG. 11) to remove rheostat 95 from across shunt 96 of motor 98 driving the take-up reel 99.

The take-up reel 99 is replaced and started before the take-up accumulator 85 is completely expanded. Approximately 30 seconds are available for a change-over at a line speed of 600 feet per minute. As the rheostat 78 is removed from across shunt 96, the take-up reel 99 pulls the cable core from the take-up accumulator at 1.2 times the line speed, whereby the tension on the supply accumulator 85 is increased. Therefore, the force exerted on movable carriage 87 by the cable core is greater than the force exerted on the carriage 87 by constant torque motor 89, thereby collapsing the supply accumulator 85 so as to maintain a constant tension on the cable core 13. As the carriage 87 approaches the end of its travel, belt-driven cam 97 opens switch 100 (FIG. 11), inserting rheostat 95 into series with shunt 96 of motor 98. The rheostat 95 is actuated to increase the resistance across shunt 96 in response to further movement of carriage 87 so as to slow down the motor 98 so that the speed of take-up reel 99 is reduced to line speed. Therefore, a continuous flow of cable core is maintained from the extruder head 19 to the take-up reel 99 at the constant predetermined line speed.

The constant torque motors 30 and 89 exert a constant force on the movable carriages 12 and 87, respectively. Therefore, a constant tension is maintained on the cable core at all times. In this manner, it is possible to maintain a constant flow of cable core through an extruder at a constant rate of speed without exerting excessive tensional forces on the cable core.

It is to be understood that the above-described arrangements are simply illustrative of the application of the principles of this invention and that numerous other arrangements may be readily devised by those skilled in the art without departing from the spirit and scope thereof.

What is claimed is:

1. In an apparatus for maintaining a constant flow of a strand through an extruder at a constant predetermined line speed,
   a first fixed sheave assembly having a shaft with a plurality of sheaves mounted adjacent one another for rotation on the shaft,
   a first trackway adjacent the sheave assembly,
   a first carriage carried by the first trackway for longitudinal displacement relative to said first sheave assembly and having a shaft parallel to the shaft of the assembly and a plurality of sheaves mounted adjacent one another for rotation on the shaft,
   means for delivering the strand to the sheaves of the first assembly and the first carriage at a rate of speed variable from zero to a speed greater than the predetermined line speed,
   means for pulling the strand from the sheaves of the assembly and carriage at the predetermined line speed,
   means for exerting a constant force on said first carriage opposite and equal to the force exerted on said first carriage by the strand when the strand is delivered to the sheaves of the first assembly and first carriage at the predetermined line speed,
   a second trackway,
   a second fixed sheave assembly having a shaft extending transverse to the second trackway with a plurality of sheaves mounted adjacent one another for rotation on the shaft,
   a second carriage carried by the second trackway for longitudinal displacement relative to said second sheave assembly and having a shaft parallel to the shaft of the second assembly and a plurality of sheaves mounted adjacent one another for rotation on the shaft.
   means for delivering the strand to the sheaves of the second assembly and the second carriage at the predetermined line speed,
   means for pulling the strand from the sheaves of the second assembly and second carriage at a rate of speed variable from zero to a speed greater than the predetermined line speed, and
   means for exerting a constant force on said second carriage opposite and equal to the force exerted on said second carriage by the strand when the strand is pulled from the sheaves of the second assembly and second carriage at the predetermined line speed.

2. In an apparatus for maintaining a constant flow of cable core through an extruder at a constant predetermined line speed, a first fixed sheave assembly having a shaft with a plurality of sheaves mounted adjacent one another for rotation on the shaft, a trackway adjacent the assembly, a first carriage carried by the trackway for longitudinal displacement relative to said first sheave assembly and having a shaft parallel to the shaft of the first assembly and a plurality of sheaves mounted adjacent one another for rotation on the shaft, whereby upon displacement of the first carriage to the end of its travel the accumulator is expanded and upon displacement of the first carriage into a position adjacent the assembly the accumulator is collapsed, means for delivering the strand to the sheaves of the first assembly and the first carriage at a rate of speed variable from zero to a speed greater than the predetermined line speed, means for pulling the strand from the sheaves of the first assembly and first carriage at the predetermined line speed, means for exerting a constant force on said first carriage opposite and equal to the force exerted on said first carriage by the strand when the strand is delivered to the sheaves of the first assembly and first carriage at the predetermined line speed, means for maintaining the speed at which the strand is delivered to said sheave first assembly and to said first carriage at the constant predetermined line speed when said first sheave assembly and said first carriage are expanded, means for maintaining the speed at which the strand is delivered to said first sheave assembly and to said first carriage at a speed greater than the constant predetermined line speed when said first sheave assembly and said first carriage are collapsed, a trackway, a second fixed sheave assembly having a shaft extending transverse to the trackway with a plurality of sheaves mounted adjacent one another for rotation on the shaft, a second carriage carried by the trackway for longitudinal displacement relative to said second sheave assembly and having a shaft parallel to the shaft of the second assembly and a plurality of sheaves mounted adjacent one another for rotation on the shaft, whereby upon displacement of the second carriage to the end of its travel the accumulator is expanded and upon displacement of the second carriage into a position adjacent the assembly the accumulator is collapsed, means for delivering the strand to the sheaves of the second assembly and the second carriage at the predetermined line speed, means for pulling the strand from the sheaves of the second assembly and second carriage at a rate of speed variable from zero to a speed greater than the predetermined line speed, means for exerting a constant force on said second carriage opposite and equal to the force exerted on said second carriage by the strand when the strand is pulled from the second sheave assembly and second carriage at the predetermined line speed, means for maintaining the speed at which the strand is pulled from said second sheave assembly and from said second carriage at the predetermined line speed when said second sheave assembly and said second carriage are collapsed, and means for maintaining the speed at which the strand is pulled from said second sheave assembly and from said second carriage at a speed greater than the predetermined line speed when said second sheave assembly and said second carriage are expanded.

3. In an apparatus for maintaining the continuous flow of a strand to an extruder at a constant predetermined line speed, a first fixed sheave assembly having a shaft and a plurality of sheaves mounted adjacent one another for rotation on the shaft, a first trackway adjacent the assembly, a first carriage carried by the first trackway for longitudinal displacement relative to said first sheave assembly and having a shaft parallel to the shaft of the first sheave assembly and a plurality of sheaves mounted adjacent one another for rotation on the shaft, means for delivering the strand to the sheaves of the first assembly and first carriage at a speed variable from zero to a speed greater than the predetermined line speed, means for pulling the strand from the sheaves of the first assembly and first carriage at the constant predetermined line speed, means for exerting a force on the first carriage equal and opposite to the force exerted by the strand on the first carriage when the strand is delivered to the sheaves of the first assembly and first carriage at the predetermined line speed, rollers for supporting the catenary weight of the strand carried below the sheaves of the first assembly and first carriage, a plurality of support arms extended over the first trackway for supporting the catenary weight of the strand carried on top of the sheaves of the first assembly and first carriage, means for retracting a support arm as the first carriage approaches so as to permit the first carriage to pass by the support arm, a second trackway, a second fixed sheave assembly having a shaft transverse to the second trackway and a plurality of sheaves mounted adjacent one another for rotation on the shaft, means for delivering the strand to the sheaves of the second assembly and second carriage at the constant predetermined line speed, means for pulling the strand from the sheaves of the second assembly and second carriage at a speed variable from zero to a speed greater than the predetermined line speed, means for exerting a force on the second carriage equal and opposite to the force exerted by the strand on the second carriage when the strand is pulled from the sheaves of the second carriage at the constant predetermined line speed, rollers for supporting the catenary weight of the strand carried below the sheaves of the second assembly and second carriage, a plurality of support arms extended over the second trackway for supporting the catenary weight of the strand carried on top of the sheaves of the second assembly and second carriage, and means for retracting a support arm as the second carriage approaches so as to permit the second carriage to pass by the support arm.

References Cited in the file of this patent
UNITED STATES PATENTS

| | | |
|---|---|---|
| 3,049,308 | Lang | Aug. 14, 1962 |
| 3,051,362 | Shook | Aug. 28, 1962 |

UNITED STATES PATENT OFFICE
CERTIFICATE OF CORRECTION

Patent No. 3,163,372 December 29, 1964

Lawrence Goldman et al.

It is hereby certified that error appears in the above numbered patent requiring correction and that the said Letters Patent should read as corrected below.

Column 3, line 11, after "FIG. 6," insert -- a --; column 5, line 47, for "rheostat 80" read -- rheostat 78 --.

Signed and sealed this 29th day of June 1965.

(SEAL)
Attest:

ERNEST W. SWIDER
Attesting Officer

EDWARD J. BRENNER
Commissioner of Patents